(12) United States Patent
Mardilovich et al.

(10) Patent No.: US 7,405,012 B2
(45) Date of Patent: Jul. 29, 2008

(54) OSCILLATING GAS FLOW IN FUEL CELLS

(75) Inventors: Peter Mardilovich, Corvallis, OR (US); David Champion, Lebanon, OR (US); Gregory S Herman, Albany, OR (US); James O'Neil, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 405 days.

(21) Appl. No.: 10/359,976

(22) Filed: Feb. 7, 2003

(65) Prior Publication Data

US 2004/0157093 A1 Aug. 12, 2004

(51) Int. Cl.
*H01M 8/00* (2006.01)
*H01M 8/10* (2006.01)
*H01M 8/12* (2006.01)

(52) U.S. Cl. .......................... 429/13; 429/30

(58) Field of Classification Search .................. 429/12, 429/13, 22
See application file for complete search history.

(56) References Cited

U.S. PATENT DOCUMENTS

| 6,093,502 A * | 7/2000 | Carlstrom et al. ............. 429/25 |
| 6,096,448 A | 8/2000 | Wilkinson et al. |
| 6,159,629 A | 12/2000 | Gibbs et al. |
| 6,440,594 B1 * | 8/2002 | Kindler et al. ................ 429/13 |

FOREIGN PATENT DOCUMENTS

| JP | 6203861 | 7/1994 |
| JP | 2000348745 | 12/2000 |
| WO | WO03099965 | 12/2003 |

* cited by examiner

*Primary Examiner*—Jonathan Crepeau
*Assistant Examiner*—R. Hodge (57) ABSTRACT

A method of operating a fuel cell includes supplying a gas stream to the fuel cell and oscillating the gas stream.

12 Claims, 6 Drawing Sheets

OSCILLATING GAS FLOW IN FUEL CELLS

BACKGROUND

Fuel cells conduct an electrochemical reaction to produce electrical power. The typical fuel cell reactants are a fuel source such as hydrogen or a hydrocarbon, and an oxidant such as air. Fuel cells provide a DC (direct current) that may be used to power motors, lights, or any number of electrical appliances. There are several different types of fuel cells, each using a different chemistry.

Fuel cells typically include three basic elements: an anode, a cathode, and an electrolyte. Usually the anode and cathode are sandwiched around the electrolyte. The electrolyte prohibits the passage of electrons. Fuel cells are usually classified by the type of electrolyte used. The fuel cell types are generally categorized into one of five groups: proton exchange membrane (PEM) fuel cells, alkaline fuel cells (AFC), phosphoric-acid fuel cells (PAFC), solid oxide fuel cells (SOFC), and molten carbonate fuel cells (MCFC).

The anode and cathode are porous and usually include an electrocatalyst, although each may have a different chemistry. Fuel migrates through the porous anode and an oxidant migrates through the porous cathode. The fuel and oxidant react to produce various charged particles, which include electrons at the anode. The electrons cannot pass through the electrolyte and therefore become an electrical current that can be directed to an external circuit. The cathode conducts the electrons back from the external circuit, where they recombine with various ions and oxygen and may form water and/or other by-products. Often a number of fuel cells are arranged in a stack to provide a useful amount of electrical power.

In many fuel cell applications, supplies of fuel and oxidant are connected to a housing that contains the fuel cell. However, much of the fuel provided to the fuel cell is often underutilized. As fuel is provided to the anode of a fuel cell, the fuel available at the surface of the anode is usually consumed quickly, while fuel at some distance from the anode is consumed more slowly and must migrate toward the anode for more efficient consumption. This phenomenon results in a fuel concentration gradient within the fuel cell. The effective use of the fuel then depends on the gas diffusion rate with which the fuel migrates to reach the anode.

Currently, fuel concentration gradients and gas diffusion rates are significant inhibitors to fuel cell performance, especially so with solid oxide fuel cells that can operate using a variety of fuels. There have been some attempts to improve fuel cell performance by quickly providing fresh supplies of fuel to the surface of the anode to fully utilize the ability of the anode to consume fuel. However, this is currently done at the expense of exhausting much of the fuel unused through the system or using a complicated manifold system with significant pressure losses.

SUMMARY

In one of many possible embodiments, the present invention provides a method of operating a fuel cell. The method includes supplying a gas stream to the fuel cell and oscillating the gas stream.

Another embodiment of the present invention provides a gas flow controller including a fluid flow oscillator operatively connected to a fluid stream, where the fluid stream is in communication with a fuel cell.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

A method and system are described herein for minimizing the formation of fuel concentration gradients within the fuel cell by oscillating or varying the direction of fuel and/or oxidant flow in the fuel cell. As used throughout the specification and claims, the term "oscillate" or "oscillating" is used to mean any variation in the flow of fuel or oxidant in a fuel cell other than simply periodically starving the anode of reactant. The oscillation may be periodic or irregular, a smooth continuous transition or an abrupt transition, including complete interruptions and reversals in the flow direction.

Figure 1:
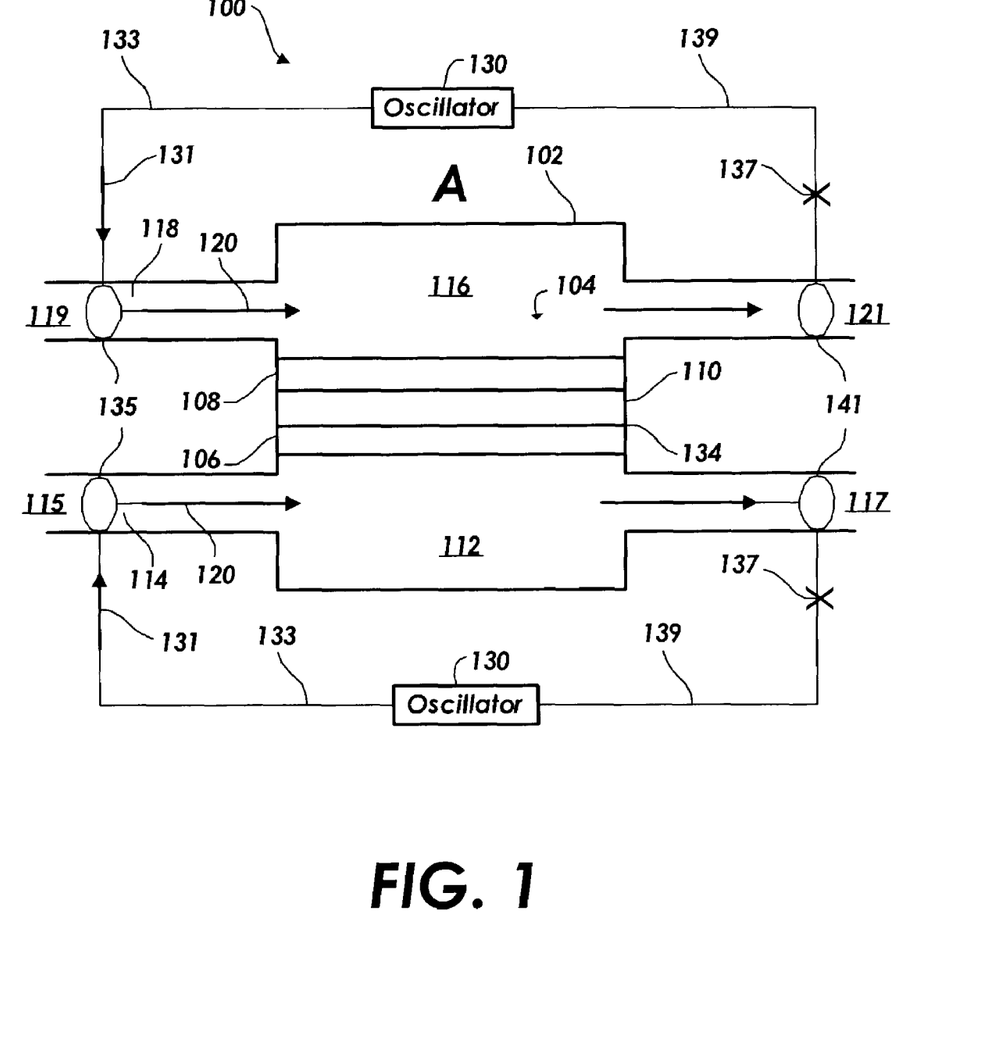
FIG. 1 is a representation of a fuel cell system according to one embodiment of the present invention with a gas stream passing through the fuel cell in a first direction.

Referring now to the figures, and in particular FIG. 1, a schematic representation of a fuel cell system (100) is shown. The fuel cell system (100) includes a housing (102) and a fuel cell (104) within the housing (102). Of course, it will be understood that the fuel cell system (100) may include multiple fuel cells arranged in a stack. Thus, the fuel cell (104) may be single fuel cell or a number of fuel cells operating as a unit.

The fuel cell (104) includes an anode (106), a cathode (108), and an electrolyte (110) sandwiched between the anode (106) and the cathode (108). The electrolyte (110) may include a solid oxide membrane, a proton exchange membrane, or other membranes used for other fuel cell types. It will be understood, however, that the fuel cell system (100) is not limited to the anode/electrolyte/cathode sandwich configuration shown. Other fuel cell systems, for example porous supports and current collector supported systems may also be used.

The anode (106) and cathode (108) may include current collection layers and therefore also function as current collectors as the electrochemical reaction of the fuel cell takes place. Current generated by the fuel cell (104) may be directed to an external circuit to do useful work.

According to the design shown in FIG. 1, the fuel cell (104) separates the interior of the housing (102) into two chambers. A first of the two chambers is a fuel chamber (112) that is open to the anode (106) of the fuel cell (104). The fuel chamber (112) is in fluid communication with one or more gas streams (114) that provide fuel to the fuel cell (104). The fuel stream (114) has first and second portions (115 and 117) corresponding to an inlet and an outlet, respectively, to the fuel chamber (112). The fuel stream (114) supplies various fuels to the anode (106) of the fuel cell (104), depending on the fuel cell type. For example, if the fuel cell (104) is a solid oxide fuel cell, the fuel may be hydrogen or any of a number of hydrocarbons or alcohols. However, if the fuel cell (104) is a proton exchange membrane (PEM) fuel cell, the fuel may be hydrogen.

A second chamber of the fuel cell system (100) is an oxidant chamber (116) open to a cathode (108) of the fuel cell (104). Similar to the fuel chamber (112), the oxidant chamber (116) is in fluid communication with one or more gas streams (118) that provide an oxidant to the cathode (108) of the fuel cell (104). Like the fuel stream (114), the oxidant stream (118) includes first and second portions (119 and 121) corresponding to an inlet and an outlet, respectively to the oxidant chamber (116). The oxidant may include air, an enriched or pure oxygen source, or some other oxidant.

As shown in FIG. 1, both the fuel and oxidant streams (114 and 118) flow through the fuel cell system (100) in a first direction. The first direction is indicated by a series of arrows (120). The fuel cell system (100), with the gas flow in the direction of the arrows (120) shown in FIG. 1, is labeled with a letter (A) in order to clarify a chart shown as FIG. 3 (discussed below). As discussed in the background, a constant flow in the direction of the arrows (120) will likely result in fuel and oxidant concentration gradients across the fuel and oxidant chambers (112 and 116). Therefore, according to principles of the invention described herein, the gas streams are oscillated by a gas controller in order to reduce or eliminate concentration gradients.

The gas controller includes one or more oscillators (130) that are capable of varying the flow of fuel or oxidant in the fuel cell system (100). The one or more oscillators (130) may include or control one or more pieces of oscillating equipment (135 and 141). The oscillating equipment (135/141) may include, but is not limited to: a reversible pump, a control valve, and/or an acoustic oscillator such as a speaker or other shock wave producer. An oscillation may also be induced by dividing and recombining the flows of fuel and/or oxidant. Therefore, the oscillating equipment (135/141) may also represent valves and manifolds that divide and recombine gas flows. Other mechanisms and methods in addition to those described above may also be used to induce an oscillation. Accordingly, "oscillator" may include any individual device or combination of components used to induce an oscillation.

One possible configuration of the oscillators (130) is shown in FIG. 1. In this configuration, the oscillators (130) control the oscillating equipment (135) and induce gas oscillations as fuel and gas flow through the first portions (115 and 119) of the fuel and oxidant streams (114 and 118), respectively. The oscillations induced by the oscillators (130) or the combination of the oscillators (130) with the oscillating equipment (135) may include a number of different regimes discussed in more detail below.

An arrow (131) along a first communication interface (133) between the oscillator (130) and the oscillating equipment (135) indicates that the oscillator is "on" and controlling the oscillating equipment (135) at the first portions (115 and 119) or inlets to the fuel and oxidant chambers (112 and 116). Similarly, a cross (137) along a second communication interface (139) indicates the oscillator (130) is "off" with respect to the oscillating equipment (141) at the second portions (117 and 121) or outlets from the fuel and oxidant chambers (112 and 116). When the oscillator (130) is "off" with respect to the oscillating equipment (141) at the second portions (117 and 121) of the fuel and oxidant streams (114 and 118), products from the fuel cell system (100) are allowed to exhaust without further manipulation as they flow through the second portions (117 and 121).

As mentioned above, according to some embodiments the oscillating equipment (135/141) may include control valves. In such embodiments, the control valves may be simple unidirectional valves that can open and shut in a controlled manner to produce a flow oscillation in a single direction. However, the control valve may also be a multi-way valve or a combination of valves capable of changing flow direction. The opening and closing of control valves and/or the redirection of flow induces flow oscillations which increase fuel cell performance. Gas oscillations minimize mass concentration gradients and induce a higher diffusion rate so that the anode (106) and the cathode (108) have access to more fuel and oxidant, respectively.

Figure 2:
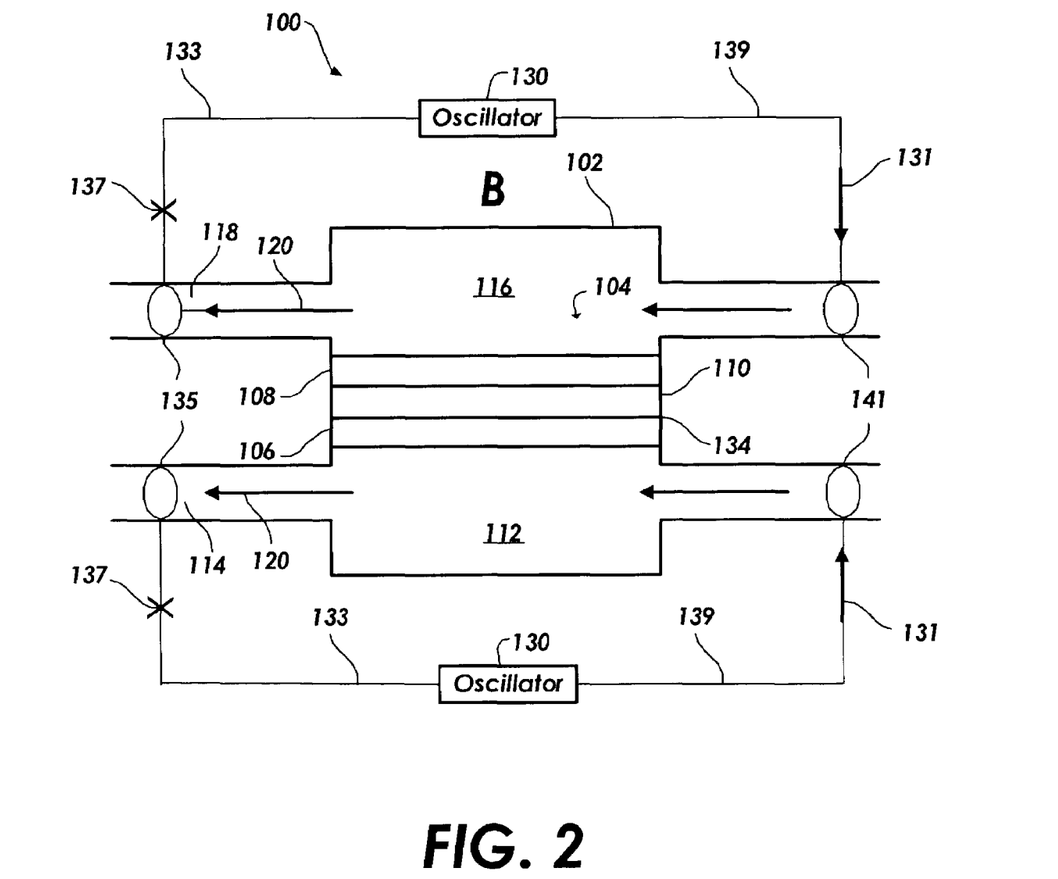
FIG. 2 is a representation of the fuel cell system of FIG. 1, with the gas stream passing through the fuel cell in a second direction.

FIG. 2 illustrates a flow oscillation created by reversing the stream flow direction. As shown in FIG. 2, the direction of flow represented by the arrows (120) is opposite of the direction shown in FIG. 1. The fuel cell system (100) with the gas flow in the direction of the arrows (120) shown in FIG. 2 is labeled with a letter (B) in order to clarify the chart of FIG. 3 (discussed below).

In order to facilitate the flow reversal from a first direction shown in FIG. 1 to a second direction in FIG. 2, the oscillators (130) may change the control pattern displayed in FIG. 1. For example, the oscillation equipment (141) at the second portions (117 and 121) of the fuel and oxidant streams (114 and 118) may be turned "on", while the oscillation equipment (135) at the first portions (115 and 119) of the fuel and oxidant streams (114 and 118) may be turned "off" as indicted by the exchange in positions of the arrows (131) and crosses (137). The oscillating equipment (135 and 141) may thus include multi-way valves or another combination of valves as mentioned above capable of reversing the direction of the fuel and oxidant streams (114 and 118) to enter through the second portions (117 and 121). A flow reversal of this sort is an effective way to reduce or eliminate mass concentration gradients and induce higher diffusion rates.

Figure 3:
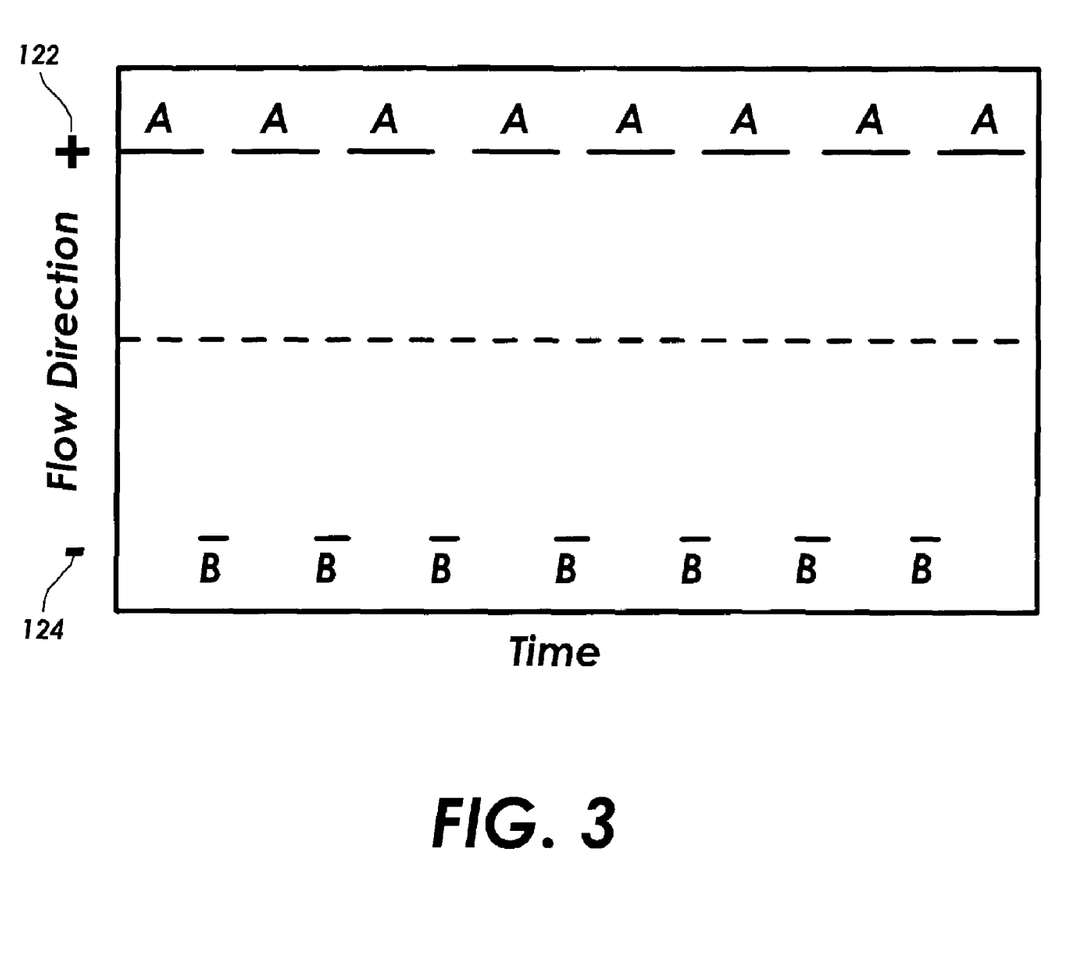
FIG. 3 is a chart illustrating the fuel flow direction as a function of time according to one embodiment of the present invention.

The gas flow reversal may be oscillated in regular or irregular patterns. For example, the flow direction may be reversed at periodic intervals as shown in the chart of FIG. 3. FIG. 3 is a chart illustrating gas flow direction as a function of time for the fuel cell system (100). As shown in FIGS. 1-2, the flow of the fuel and oxidant streams (114 and 118, FIG. 1) may be in a first or positive direction represented by a plus sign (122) for a certain time period, after which the flow direction reverses to a second or negative direction represented by a minus sign (124). The time periods during which the flow is in the first direction are labeled with the (A) reflecting the flow direction shown in FIG. 1. Similarly, the time periods during which the flow is in the second direction are labeled with the (B) reflecting the flow direction shown in FIG. 2. As illustrated by FIG. 3, the flow may be oscillated by reversing flow direction at regular intervals in time. However, according to some aspects of the invention the oscillation may be irregular.

In addition, while FIG. 3 shows the gas flow pattern in the positive direction (122) is maintained for much longer periods of time than the flow intervals in the negative (124) direction, this is not necessarily so. The flow direction time intervals may differ from one application to another. For example, the flow direction time intervals may be equal, the time periods in the negative direction (124) may be longer than time periods in the positive direction (122), or there may be an interspersing of time periods of various lengths in both the positive (122) and negative directions (124).

According to the embodiment of FIGS. 1-3, the gas flow is oscillated to improve fuel cell performance by periodically reversing the flow direction of gas streams supplied to the fuel cell system (100). The oscillators (130) may, however, also oscillate gas streams by inducing other kinds of flow oscillations as well, which are discussed in more detail further below with reference to FIGS. 5-6.

The embodiments of FIGS. 1-2 illustrate a fuel cell system (100) with separate fuel and oxidant chambers (112 and 116). However, other fuel cell system configurations may also be used. For example, a single chamber fuel cell system (200) shown in FIGS. 4A-D may be used. According to the fuel cell system (200) of FIGS. 4A-D, there may be only one gas stream (214) and one reaction chamber (212). The gas stream (214) may be a combined fuel/oxidant mixture. Accordingly, an anode (206) may include materials that limit reaction to the fuel portion of the gas mixture, while the cathode (208) includes materials that will only react with the oxidant portion of the gas mixture.

The single chamber fuel cell systems (200), absent the principles disclosed herein, will suffer same from poor performance described above with reference to FIGS. 1-2 because of fuel concentration gradients that will occur within the chamber (212). Therefore, the gas stream (214) may be oscillated by one or more oscillators (230) according the description above and with reference to FIG. 3 by reversing gas flow directions.

In addition, the one or more oscillators (230) may provide other oscillations within the gas stream (214) in a single flow direction. It will be understood that the oscillations may be induced at a number of places according to the single-chamber fuel cell system (200). Therefore, oscillating equipment (235 and 241) is shown located at a convergence between the fuel and oxidant streams in FIGS. 4A-B. For example, the oscillators (230) may oscillate the fuel and oxidant flows before they mix into the single gas stream (214), after the fuel and oxidant flows mix, or both before and after the fuel and oxidant flows mix.

Figure 4A:
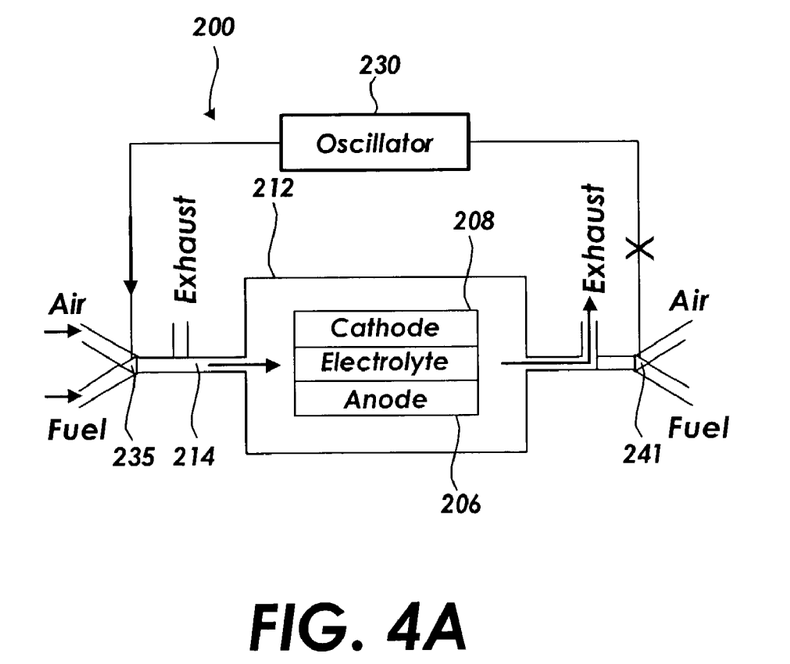
FIG. 4A is a representation of single chamber fuel cell system according to one embodiment of the present invention.
Figure 4B:
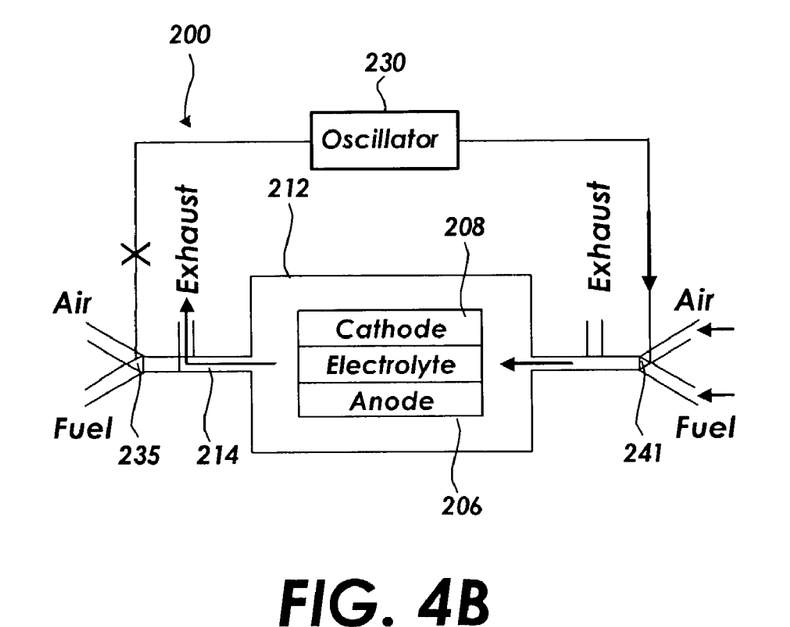
FIG. 4B is a representation of the single chamber fuel cell system of FIG. 4A with the gas flows reversed.
Figure 4C:
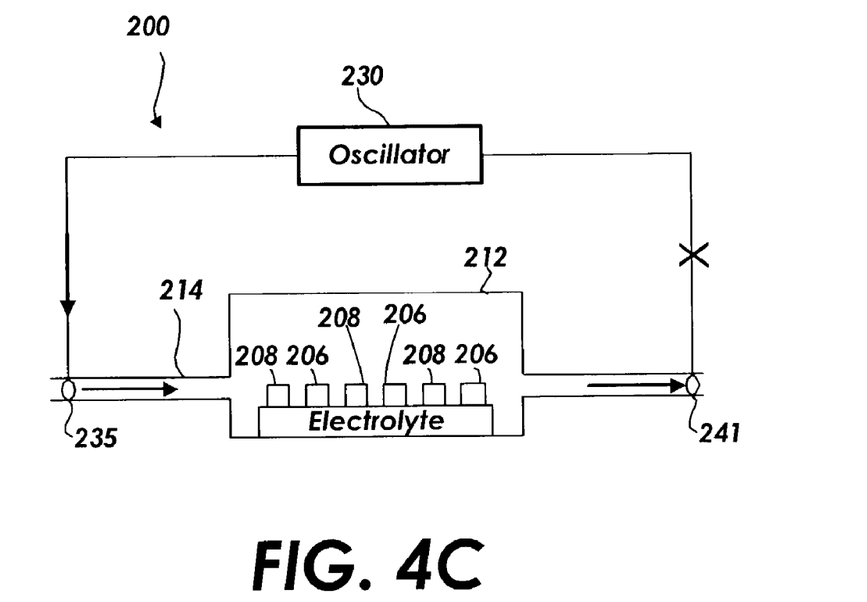
FIG. 4C is a representation of another single chamber fuel cell system according to an embodiment of the present invention.
Figure 4D:
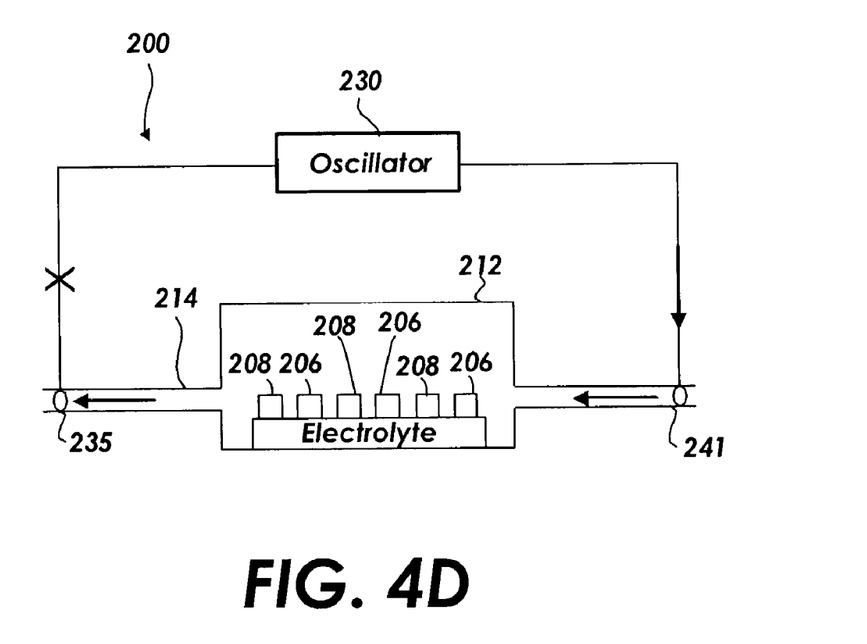
FIG. 4D is a representation of the single chamber fuel cell system of FIG. 4C with the gas flows reversed.

FIGS. 4A and 4C show the gas stream (208) of two different single-chamber (212) designs flowing in a first direction. FIGS. 4B and 4D show that the gas stream (214) may be periodically reversed in a manner similar or identical to that described with reference to FIGS. 1-2 to improve the performance of the single chamber fuel cell systems (200). As discussed above, oscillating the gas stream (214) by reversing the flow direction reduces or eliminates mass concentration gradients within the chamber (212) and increases gas diffusion rates. The oscillation may also facilitate other desirable effects.

Figure 5:
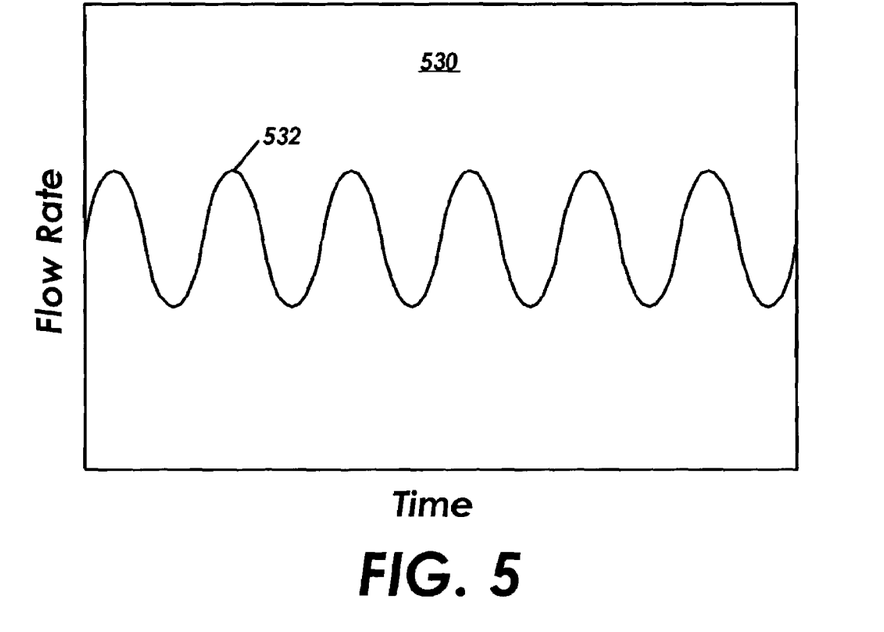
FIG. 5 is another chart illustrating fuel flow rates as a function of time through a fuel cell system according to one embodiment of the present invention.

However, in addition to oscillating a fuel cell system gas flow by reversing the flow direction, other oscillation regimes may also be used to improve fuel cell performance. For example, the gas flows of a fuel cell system may be oscillated sinusoidally in a pattern. One such sinusoidal pattern is shown in FIG. 5. FIG. 5 illustrates a symmetrical oscillation pattern for the fuel and oxidant streams (114 and 118, FIG. 1) provided to fuel and anode chambers (112 and 116, FIG. 1) respectively. Because the oscillation is symmetrical, the chart (530) of FIG. 5 shows a fuel flow rate (532) as a function of time corresponding to both the fuel stream (114, FIG. 1) and the oxidant stream (118, FIG. 1). As with reversing flow directions, sinusoidally oscillating the flow rates through the anode and cathode chambers (112 and 116, FIG. 1) reduces or eliminates concentration gradients and increases diffusion rates. Further, while the chart (530) may represent both the fuel and oxidant streams (114 and 118) of FIG. 1, it may also represent a single gas stream such as the gas stream (208) of FIGS. 4A-D. Accordingly, the oscillators (130/230) and oscillating equipment (135/141/235/241) may provide for sinusoidal oscillations, as well as flow reversals.

Figure 6:
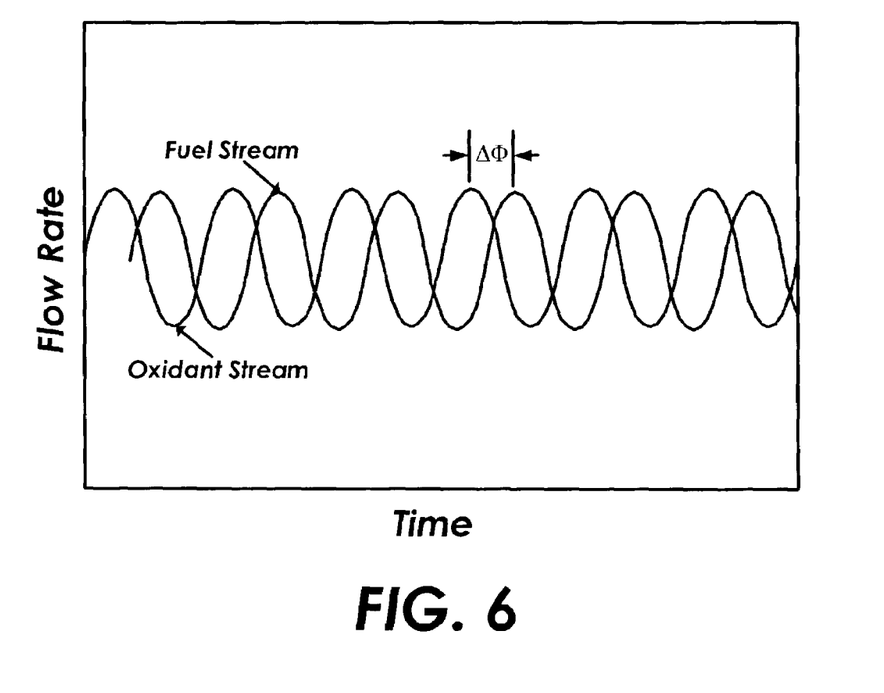
FIG. 6 is another chart illustrating gas flow rates as a function of time through a fuel cell system according to another embodiment of the present invention.

Referring next to FIG. 6, the oscillation of the fuel stream (114, FIG. 1) and the oxidant stream (118, FIG. 1) may be shifted out of phase with respect to one another. For example, the flow rate of the fuel stream (114, FIG. 1) may be shifted in time a period represented by $\Delta\omega$ with respect to the oscillation pattern of the oxidant stream (118, FIG. 1).

It may be desirable to shift the oscillation patterns of the fuel and oxidant streams (114 and 118, FIG. 1) to synchronize the fuel and oxidant availability at fuel cell primary reactions zones. For example, in an SOFC, the anode-electrolyte interface (134, FIG. 1) of the fuel cell (104, FIG. 1) is the primary reaction zone. However, it takes time for the oxidant to migrate through the cathode (108, FIG. 1), electrochemically react, and migrate through the electrolyte (110) to reach the anode-electrolyte interface (134, FIG. 1) in an SOFC. When the oxidant is $O_2$, the $O_2$ molecules dissociate into the monatomic oxygen anions as they migrate through the cathode (108, FIG. 1) and the electrolyte (110, FIG. 1).

The average time it takes for the oxidant to migrate through the cathode (108, FIG. 1) and the electrolyte (110, FIG. 1) and electrochemically react is measurable and/or calculable. Therefore, the phase shift ($\Delta\omega$) applied to the fuel or oxidant stream (114 or 118, FIG. 1) may be adjusted to match or substantially match the time it takes to transport anions from the cathode chamber (116, FIG. 1) to the anode-electrolyte interface (134, FIG. 1) of the fuel cell (104, FIG. 1). With the phase shift ($\Delta\omega$) being substantially equal to this time measurement, the availability of fuel and oxidant at the anode-electrolyte interface (134, FIG. 1) will substantially match, thereby increasing fuel cell efficiency and performance. The phase shift value ($\Delta\omega$) is a function of ionic conductivity, the thickness of the electrolyte (110), the cathode (108) and anode (106), temperature, and reaction kinetics.

It will also be understood that fuel (hydrocarbons or hydrogen) in a SOFC must also diffuse to the anode-electrolyte interface (134, FIG. 1), but taking into account the porosity of the anode and the high temperatures at which an SOFC operates, there is no significant delay for fuel migration. However, a time delay period can be calculated and taken into account, if desired, for the fuel.

Quite the opposite is true for the oxidant. As discussed, the oxidant must dissociate and diffuse through the porous cathode and the dense electrolyte to reach the anode-electrolyte surface (134, FIG. 1). The delay due to the oxidant diffusion may be the main portion of the delay period ($\Delta\omega$) for oscillation of the oxidant flow. The oscillation delay period ($\Delta\omega$) is a function of electrolyte thickness (h) and its ionic conductivity ($\sigma$). Accordingly, a thicker electrolyte will have a longer delay period. Ionic conductivity ($\sigma$) is a function of temperature and apparent activation energy (E) (with higher temperatures corresponding to higher conductivities); therefore $\Delta\omega = f(h, \sigma^{-1})$, and $\sigma = f(T)$ with $\sigma = \sigma_0 \exp(-E/kT)$.

While an SOFC has the anode-electrolyte interface (134, FIG. 1) as its primary reaction zone, other fuel cells may have other primary reaction zones. It may be equally desirable to shift the oscillation patterns of the fuel and/or oxidant streams of these other fuel cells to substantially synchronize the availability of fuel and oxidant at the primary reaction zones. For example, a DMFC has the cathode-electrolyte interface ($H^+$ diffusing through the electrolyte) as its primary reaction zone. Accordingly, the phase shift ($\Delta\omega$) in a DMFC may be calculated to substantially match the time it takes for fuel ions to migrate from the anode-electrolyte interface (134, FIG. 1), through the electrolyte (110, FIG. 1), and to a cathode-electrolyte interface (136, FIG. 1). The phase shift ($\Delta\omega$) may be adjusted to synchronize fuel and oxidant availability at any desirable reaction zone according to the present invention.

It will be understood that a phase shift is not available for a single chamber design as shown in FIGS. 4A-D because there is only one gas stream entering the chamber. With multiple fluid streams, however, the phase shift may be an effective way to maintain a substantially equal availability of both reactants (fuel and oxidant) when they meet each other at the primary reaction zone.

Although the embodiment of FIG. 6 exhibits oscillations in the flow rates of the fuel and oxidant stream that are of substantially the same wavelength, amplitude, and frequency, this is not necessarily so. The wavelengths, amplitudes, frequency, and/or phase may vary from one gas stream to another for fuel cell systems. Any symmetrical or asymmetrical oscillation pattern may also be used as desired to enhance fuel cell performance. The techniques described herein contemplate any fuel stream and/or oxidant stream oscillation. In addition, the present invention contemplates oscillations that include the sinusoidal oscillations as shown in FIGS. 5-6 as well as other oscillations that include, but are not limited to: rectangular-waves, square-waves, or other shapes, as well as the flow direction reversal oscillations discussed with reference to FIGS. 1-4. Further, the oscillation regimes may be combined. The principles of the present specification can be used to oscillate any gas stream of any fuel cell system to enhance the performance of the fuel cell.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A method of operating a fuel cell, said method comprising:
    supplying a fuel stream to said fuel cell;
    supplying an oxidant stream to said fuel cell;
    oscillating said streams, including reversing flow direction, wherein said fuel and oxidant streams are oscillated out of phase with one another; and
    phase shifting said fuel or oxidant stream oscillations by an amount corresponding to an average time to transport anions from a cathode chamber of said fuel cell to an anode-electrolyte interface of said fuel cell.

2. The method of claim 1, wherein said oscillation further comprises reversing a flow direction of said streams at irregular intervals.

3. The method of claim 1, wherein said oscillating further comprises causing said oscillating with an acoustic oscillator.

4. The method of claim 1, wherein said oscillating further comprises causing said oscillating with a shock wave producer.

5. A method of operating a fuel cell, said method comprising:
    supplying a fuel stream to said fuel cell;
    supplying an oxidant stream to said fuel cell; and
    oscillating said streams, including reversing flow direction;
    wherein said oscillating comprises flowing said fuel and oxidant streams in first respective directions and then in second respective directions, wherein said streams flow in said first respective directions for longer periods of time than in said second respective directions.

6. The method of claim 5, wherein said fuel and oxidant streams are oscillated in phase with one another.

7. The method of claim 5, wherein said fuel and oxidant streams are oscillated out of phase with one another.

8. The method of claim 7, further comprising phase shifting said fuel or oxidant stream oscillations an amount corresponding to an average time to transport anions from a cathode chamber of said fuel cell to an anode-electrolyte interface of said fuel cell.

9. The method of claim 5, wherein said oscillation further comprises reversing a flow direction of said streams at irregular intervals.

10. The method of claim 5, wherein said oscillating further comprises causing said oscillating with an acoustic oscillator.

11. The method of claim 5, wherein said oscillating further comprises causing said oscillating with a shock wave producer.

12. A method of operating a fuel cell, said method comprising:
    supplying a fuel stream to said fuel cell;
    supplying an oxidant stream to said fuel cell; and
    oscillating said streams, including reversing flow direction;
    wherein oscillating said streams comprises flowing said fuel stream and said oxidant stream in a same direction through said fuel cell during a majority of operating time; and
    wherein said fuel and oxidant streams are oscillated out of phase with one another; and
    further comprising phase shifting said fuel or oxidant stream oscillations an amount that facilitates matching an availability of fuel at an anode of said fuel cell with an availability of oxidant at a cathode of said fuel cell; and
    wherein said phase shifting takes into account an average time to transport anions from a cathode chamber of said fuel cell to an anode-electrolyte interface of said fuel cell in order to facilitate said matching of the availability of fuel and oxidant.

* * * * *